United States Patent [19]

Steinkamp et al.

[11] 4,142,936
[45] Mar. 6, 1979

[54] CORE SUPPORT STRUCTURE FOR NUCLEAR POWER PLANTS

[75] Inventors: Eckhard Steinkamp; Jürgen Tautz, both of Erlangen; Horst Ries, Bremgarten, all of Fed. Rep. of Germany

[73] Assignee: Kraftwerk Union Aktiengesellschaft, Mülheim, Fed. Rep. of Germany

[21] Appl. No.: 738,527

[22] Filed: Nov. 3, 1976

[30] Foreign Application Priority Data

Nov. 4, 1975 [DE] Fed. Rep. of Germany ....... 2549423

[51] Int. Cl.² .......................................... G21C 13/02
[52] U.S. Cl. ...................................... 176/87; 176/38; 29/445
[58] Field of Search .................. 176/37, 38, 78, 87; 29/428, 445, 457, 521

[56] References Cited

U.S. PATENT DOCUMENTS

| | | | |
|---|---|---|---|
| 3,215,608 | 11/1965 | Guenther | 176/87 |
| 3,868,302 | 2/1975 | Singleton | 176/87 |
| 3,996,102 | 12/1976 | Thome | 176/78 X |

*Primary Examiner*—Peter A. Nelson
*Attorney, Agent, or Firm*—Herbert L. Lerner

[57] ABSTRACT

Core support structure for nuclear power plants includes a grid of mutually crossing bridges and a support ring surrounding the grid and connected to ends of the outer bridges of the grid, the grid being formed of profile rod crosses having legs of given length, respective legs of pairs of adjacent crosses abutting one another endwise to form together a side of the smallest mesh opening of the grid, and weld means for securing the profile rod crosses to one another at the mutually abutting ends of the legs thereof; and method of producing the foregoing core support structure.

4 Claims, 10 Drawing Figures

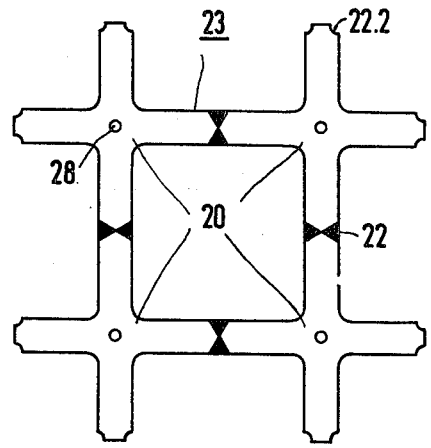
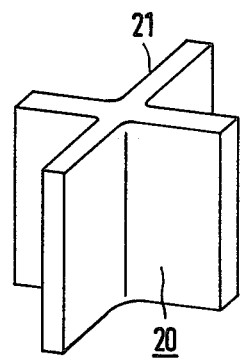
Fig.4  Fig.3
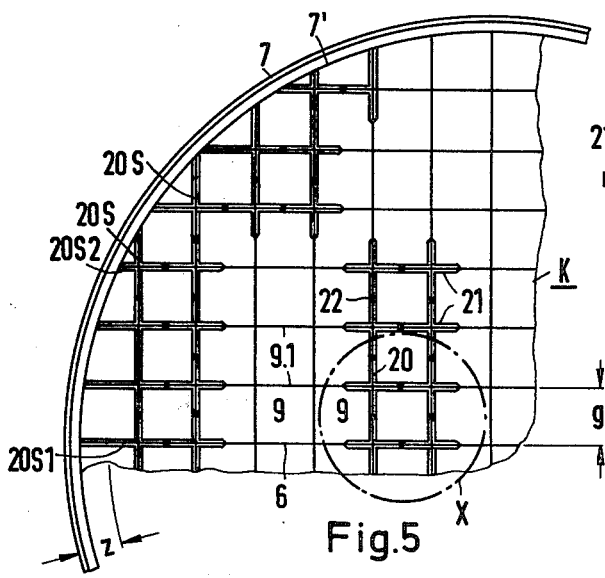
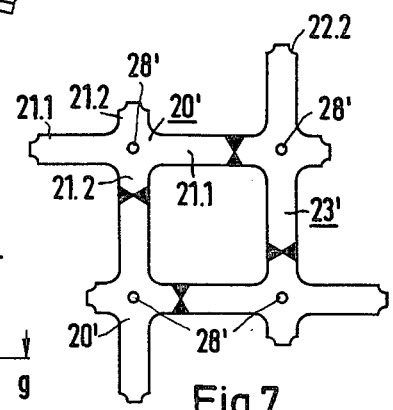
Fig.5  Fig.7
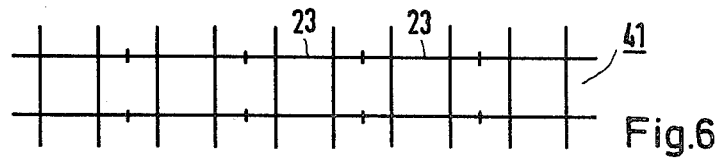
Fig.6

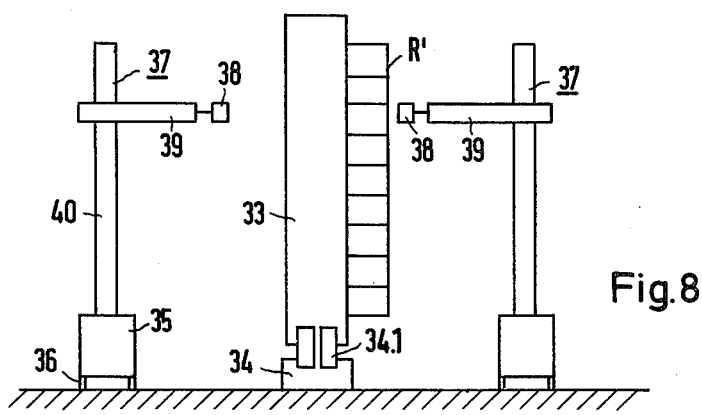
Fig. 8
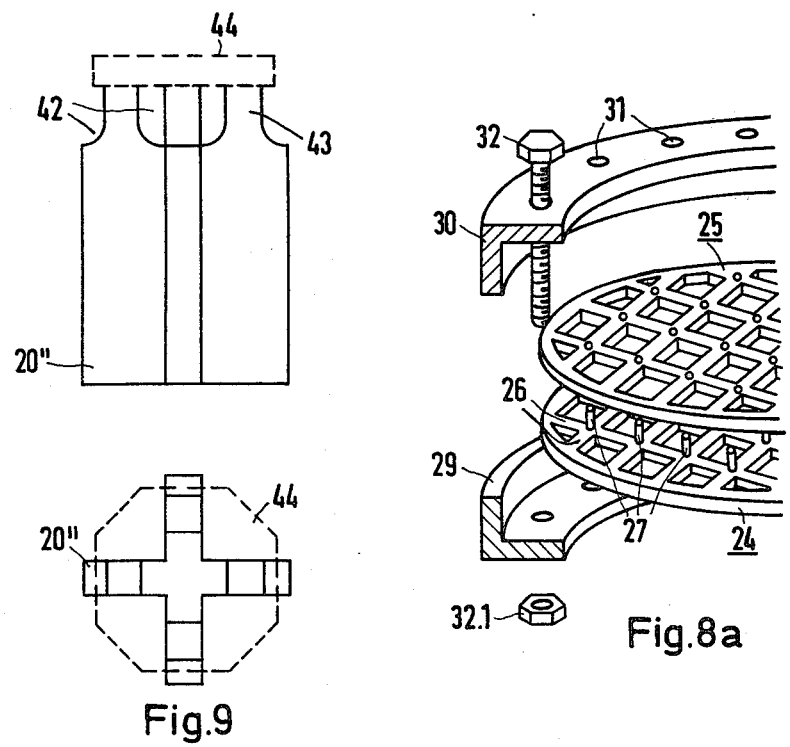
Fig. 9
Fig. 8a

CORE SUPPORT STRUCTURE FOR NUCLEAR POWER PLANTS

The invention relates to a core support structure for nuclear power plants, preferably for light water reactors, and method of producing the same, and more particularly to such a core support structure formed of a grid having mutually crossing bridges or crosspieces and a support ring surrounding the grid and connected to the ends of the outer bridges thereof.

Core support structures of this general type have been employed heretofore since 1967 in the nuclear power plants located at Obrigheim, Stade and Biblis in Germany, as well as at other locations. In a heretofore known core support structure of the aforementioned type (German Published Non-Prosecuted Application DT-OS 2 215 134), the bridges or crosspieces are formed by two different types of structural components, namely, profile rods disposed in the intersection or crossing points and plates disposed in the spaces intermediate the profile rods and welded to the profile rods. In this manner, two weld joints are produced respectively along a grid line between two profile rods.

It is an object of the invention to provide a core support structure of the foregoing type with a reduced number of required weld joints so that improvements with respect to accuracy of manufacture and stability of the grid are afforded.

With the foregoing and other objects in view, there is provided, in accordance with the invention, a core support structure for nuclear power plants comprising a grid of mutually crossing bridges and a support ring surrounding the grid and connected to ends of the outer bridges of the grid, the grid being formed of profile rod crosses having legs of given length, respective legs of pairs of adjacent crosses abutting one another endwise to form together a side of the smallest mesh opening of the grid, and weld means for securing the profile rod crosses to one another at the mutually abutting ends of the legs thereof.

The advantages attainable by the invention are apparent primarily in that not only penetrating weld joints are obtained that can be economically produced by mechanical welding methods, but also that the welded joints are disposed in a surface region of the bridges or cross pieces between intersecting or crossing points where they are readily accessible for X-ray and/or ultrasonic testing. Furthermore, a very economical, project-independent storage maintenance or stroke-keeping of profile rods as basic elements for the grid is produced. In this regard, and in accordance with another feature of the invention, the profile rod crosses are formed respectively with four legs of equal length, and the weld means comprise respective weldments located in the middle of each side of the mesh openings. An homogeneous construction for the core support structure, except at the marginal zone, is thereby produced.

In accordance with an alternate feature of the invention, the profile rod crosses are formed of two pairs of opposite legs, the legs of each pair thereof being of equal size, the legs of one of the pairs being shorter than the legs of the other of the pairs, the longer legs of the profile rod crosses being secured by the respective weld means to the respective shorter legs of the adjacent profile rod crosses. In this case, the position of the welded joint is no longer in the middle of the side of the mesh opening yet nevertheless in the accessible surface region of the bridges or cross pieces. The advantage of this alternate embodiment is that the basic elements can be formed especially simply as profile rods of selected length since they approximate a flat profile.

To produce the marginal zone region of the grid, the grid can be welded together of the basic elements so that it is approximately circular, then, the excess material in the marginal zone can be severed along a circular line, and the grid can thereafter be inserted into the support ring and welded thereto. In accordance with yet another feature of the invention, special profiles are employed, namely, most of the profile rod crosses of the grid are each formed with legs of given relative length except for profile rod crosses in the marginal zone of the grid at the support ring, the latter profile rod crosses, respectively, having longer and shorter legs than those of the profile rod crosses having legs of given relative length in accordance with the curvature of the circular support ring.

In accordance with another aspect of the invention, a method of producing the core support structure is provided which comprises welding respective groups of four profile rod crosses together at mutually abutting ends of the legs thereof to form respective grid structural units, machining welding edges at the free ends of the legs of the grid structural units, assembling a multiplicity of the grid structural units into at least part of a grid in a position corresponding to that of a core support structure, holding the assembled grid structural units centered and attaching the grid structural units to one another, clamping the attached grid structural units to one another. The grid structural units can thus be prefabricated and can be stored or kept in stock in this form. Whenever a requirement for a core support structure arises, it can be produced relatively rapidly and accurately from the stored grid structural units.

In accordance with another mode of the method of the invention, the grid structural units are assembled into rows of varying chord lengths, held in aligned position and welded to one another, the rows of welded-together grid structural units of varying chord lengths being clamped onto a welding grid in a disposition corresponding to that of a completed grid, and welding the clamped rows of grid structural units together into a complete grid. The special advantage of this mode of the method of the invention is that a defined longitudinal and transverse contraction or shrinkage is obtained since the welding together of the grid structural units occurs sequentially in both of these main directions. Moreover, the rows assembled of grid structural units are also well suited for forming intermediate layers.

Other features which are considered as characteristic for the invention are set forth in the appended claims.

Although the invention is illustrated and described herein as core support structure for nuclear power plants, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 3 is a diagrammatic perspective view of an individual profile rod cross of symmetrical construction forming part of the inventive core support structure of FIGS. 1 and 2;

FIG. 4 is a top plan view of a grid structural unit formed of four profile rod crosses corresponding substantially to that of FIG. 3;

FIG. 5 is a diagrammatic top plan view, partly broken away, of a quadrant of a core support grid with a support ring in accordance with the invention;

FIG. 6 is a diagrammatic view of a grid row which is formed of a multiplicity of grid structural units that are welded together as an intermediate stage in the production of the support grid;

FIG. 7 is another view similar to that of FIG. 4 of another embodiment of a grid structural unit according to the invention;

FIG. 8 is a diagrammatic view of a welding apparatus for the grid with a welding grid for clamping the grid structural units, that are to be welded together, while maintaining the upright position of the grid or the horizontal disposition of the grid structural units thereof, and with two welding devices disposed at both sides thereof;

FIG. 8a is a fragmentary perspective view, partly in section, of a centering and clamping device for securing the grid structural units to one another; and FIG. 9 and 9a are respective diagrammatic elevational and top plan views of an individual profile rod cross which is provided at the upper end thereof, as viewed in FIG. 9, with window-like recesses for the formation of feet therein, to which a plate, shown in broken lines, which should serve as a support surface for a nuclear fuel element, is welded.

Figure 1:
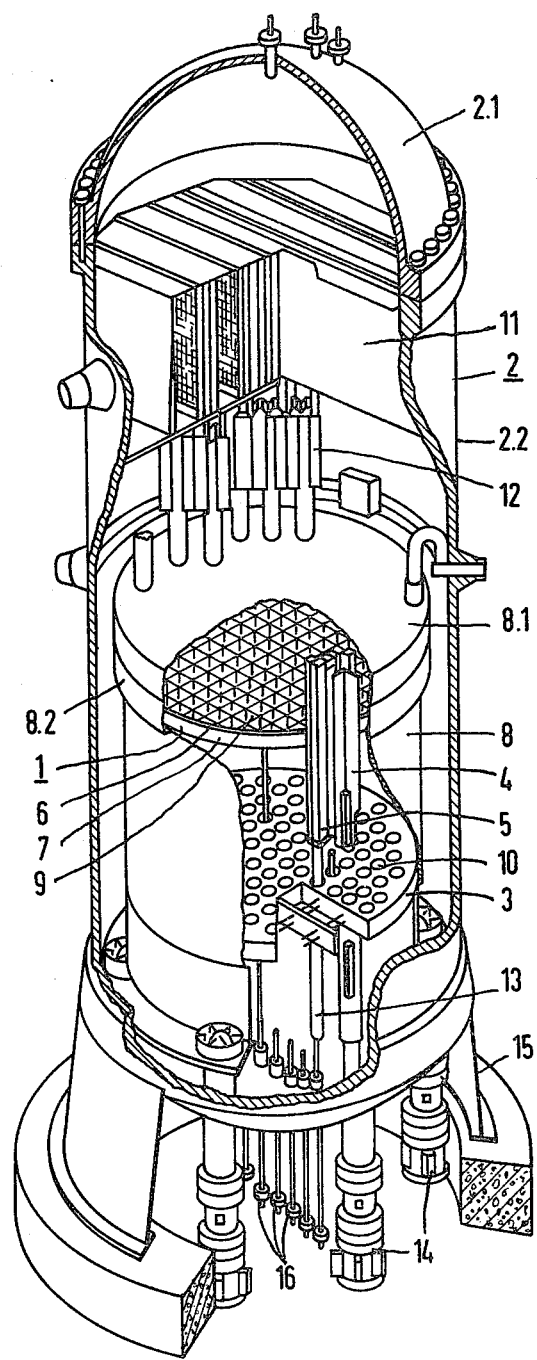
FIG. 1 is a perspective view, partly in section and partly broken away, of a core support structure of a nuclear reactor, according to the invention, which is built into a boiling water reactor pressure vessel.

Referring now to the drawing and first, particularly to FIG. 1 thereof, there is shown a core support structure 1, represented in FIG. 1 as a upper core grid support plate, in a pressure vessel 2 for boiling water reactors. A lower core grid support plate 3 is disposed in a plane spaced from and parallel to the core support structure 1 and, together with the latter, serves to provide precise axial guidance and support of the control rods 4 and the fuel elements 5, only one of each of which is actually shown in FIG. 1. It is readily apparent that the core support structure 1 is formed of a grid of mutually crossing bridges and a support ring 7 surrounding the grid and connected to the ends of the outer bridges 6. The core support structure 1 is, as seen, within a pot-shaped core casing 8 having a cover 8.1 disposed on the inner edge of a flange 8.2 of the casing 8. The core support structure 1 and the lower core grid plate 3 are important for accurate positioning and guidance of the fuel elements 5 and the control rods 4 so that exact dimension of stabililty is essential. The remaining parts in the reactor pressure vessel 2 are not of importance for understanding the invention of the instant application; it should merely be noted that they include a steam dryer 11, a steam separator 12, control rod guidance tubes 13, internal axial pumps 14, a support frame 15, a pressure vessel cover 2.1, a pot-shaped lower part 2.2 of the pressure vessel 2, as well as a control rod drive 16.

Figure 2:
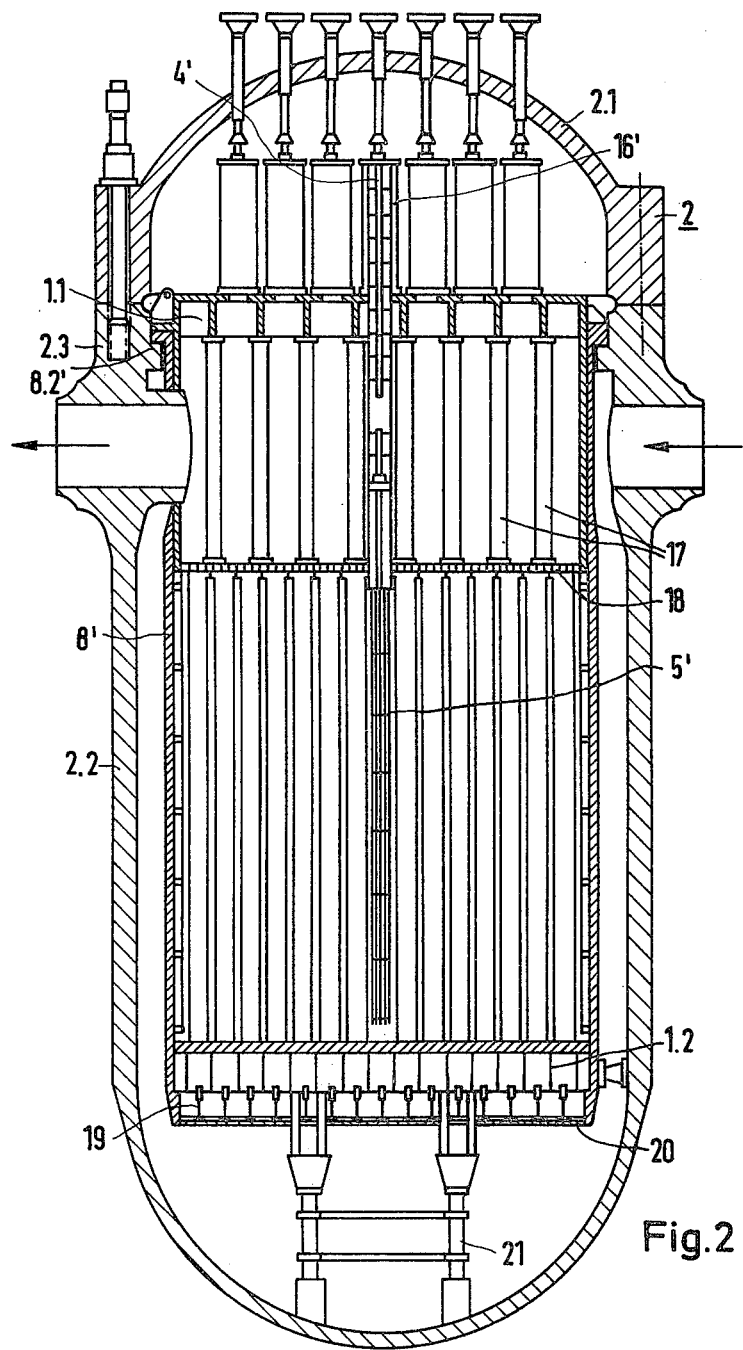
FIG. 2 is a diagrammatic vertical sectional view of a reactor pressure vessel with built-in components of a pressurized water reactor wherein the core support structure of the invention is employed as upper and lower support grid.

In FIG. 2, there is shown a reactor pressure vessel 2' for pressurized water reactors wherein the core support structure according to the invention of the instant application is employed as an upper core support structure 1.1 and as a lower core support structure 1.2. Moreover, those parts shown in FIG. 2 which corresponds to like parts shown in FIG. 1 are identified by the same reference numerals with the addition of a prime thereto. The core vessel 8' is suspended by a flange 8.2' formed thereon from an inner collar formed on the pressure vessel 2' at the axial joint 2.3 between the lower pot-shaped part 2.2 and the cover 2.1 thereof. The upper core support structure 1.1 forms a removable insert which includes upright support columns 17 and a grid plate 18 supported thereby. The lower core support structure 1.2 serves as a lower support, with support plates not visible in FIG. 2, for the fuel elements 5' of which, as in the case of the control rods 4', only one thereof is shown; actually, the reactor core is formed, however, by a multiplicity of such fuel elements 5' with intermediately disposed control rods 4'. The lower core support structure 1.2 is seated, in turn, upon a core vessel flange 19 and is fixed thereon with suitable threaded connecting means. A compression plate 20 and a stool-like structure 21 hold the core vessel 8' away from the base of the pressure vessel 2' and, accordingly, assure uniform subjection of the reactor core to coolant. In this case, also, dimensional stability and accuracy of the core support structure 1.1 and 1.2 is of great importance.

FIG. 5 shows a core support structure K formed of profile rod crosses (note FIG. 3) having respective legs 21 of such length that the respectively meeting legs 21 of each pair of crosses 20 adjoining one another provide the lateral length g of the smallest grid field unit or mesh 9. Only one weldment or welding location is required for each side 9.1 of the smallest mesh 9, by means of which the profile rod crosses 20 are connected to one another at the junctions 21.1 of the legs 21 thereof. FIG. 5 together with FIG. 3 show that the profile rod crosses 20 each have four legs 21 equal length so that the welded joints 22 are located at the middle of the respective sides 9.1 of the grid field or mesh. Relatively good accessibility for X-ray or ultrasonic material-testing is thereby assured.

FIG. 4 shows a grid structural unit 23 formed of four profile rod crosses 20 and is an enlargement of the detail of FIG. 5 encircled by the dot-dash line X. The grid structural unit 23 is in prefabricated form an element which is already very exact and dimensionally stable and have welding edges 22.2 already formed therein. It can accordingly be kept in stock in this form i.e. as grid structural unit 23, and, when a complete support grid is required, far less weldments are then necessary, namely about half less, so that thermal stresses and distortion or warping phenomena are also minimized.

FIG. 7 shows another embodiment of the grid structural unit 23 wherein the profile rod crosses 20' are provided with oppositely disposed pairs of legs 21.1 and 21.2, each of the pairs of legs being of equal size, but the pairs of legs 21.1 being longer than the pairs of legs 21.2, and the respective longer legs 21.1 being welded to a respective adjacent shorter leg 21.2. No view of a core support structure employing the grid structural unit 23 of FIG. 7 is provided in the drawing because the appearance should be readily obvious and is basically analogous to the view of FIG. 5. In the latter figure, the grid or net 6 shows the division raster of the core support structure K and the profile rod crosses 20 or grid structural units 23 are shown only fragmentarily. In the marginal zone z of the core support structure K, profile rod crosses 20.1 are employed which are provided with legs 21.1 that are lengthened in comparison to the normal profile rod crosses 20, and profile rod crosses 20.2 are furthermore employed which are provided with legs 21.2 that are shortened in comparison to the normal profile rod crosses 20. For a given support frame construction, these marginal zone profile rod crosses can be prefabricated and kept in stock; it is possible, however, as noted hereinbefore, to prefabricated the entire core support structure K out of the same embodiment of the profile rod crosses 20 so that they will adequately jut out in the region of the marginal zone so that the excess material can then be severed along the circle 7' by a suitable severing device. After refacing or regrinding and joining of the weld edges, the thus formed grid can then be welded to the support ring 7.

FIGS. 3, 4 and 7 show that the profile rod crosses 20 and 20' can be severed from rod material so that very inexpensive mass production thereof is provided. For the method of production thereof an advantageous method step has already been described hereinbefore, namely, the method of production of the grid structural units 20 (FIG. 4) or 20' (FIG. 7). The grid structural units are provided with weld edges 22.2 and assembled into a grid in a location corresponding to that of the completed core support structure K, held centered and then attached or fixed. To hold the grid centered, a device can be employed such as that shown in section in FIG. 8a. The holding device of FIG. 8a is formed of a lower holding plate 24 and an upper holding plate 25, both of the holding plates 24 and 25, respectively, having a network of mutually crossing bridges or crosspieces 26 with centering pins 27. These centering pins 27 facing in the same direction are provided so as to engage in corresponding centering bores 28 (FIG. 4) and 28' (FIG. 7). If the grid structural units 23 are laid upon the lower plate 24 in a configuration corresponding to the completed grid R', the upper plate 25 is lowered on the assembly, and then the upper and lower holding plates 25 and 24 together with the grid structural units 23 disposed therebetween are clamped together by means of clamping rings 29 and 30 which are provided with bores 31 for clamping screws 32 distributed over the periphery of the clamping rings 29 and 30. The lower clamping ring 29 and the upper clamping ring 30 are constructed as angle rings. Only one of the clamping screws 32 with a nut 32.1 therefor is shown in FIG. 8a. Of course, a multiplicity of such clamping screws 32 and nuts 32.1 are actually distributed over the periphery of the clamping rings 29 and 30. If the grid units 23 are clamped in the clamping and centering device according to FIG. 8a, they can then be joined together, so that the thus completed grid unit will have an adequate cohesion or mutual connection and an adequate natural stability and can be introduced into the welding device shown in FIG. 8.

After removal of the clamping and centering device according to FIG. 8a, the joined grid R' is then clamped into the welding frame or grid 33 according to FIG. 8. The welding grid 33 is provided with non-illustrated clamping devices and is carried by a roller stand or support 34 provided with rollers 34.1 so that the welding grid or frame 33 can also be turned in position thereof. In FIG. 8, the erected position of the welding grid 33 with the assembled grid R' clamped therein is illustrated. On both sides of the welding grid 33, welding gallows or brackets 37 are provided which can suitably travel past the welding grid 33 on carriages 35 having rollers 36. Each of the welding brackets 37 has a welding head 38 which is mounted on an arm 39 so as to be adjustable in longitudinal direction thereof. The arm 39 is furthermore mounted so as to be adjustable in height on the vertical arm 40 of the bracket 37. Welding machines are located in the carriage 35, the welding machines of both carriages 35 being simultaneously operable, which is a convenience due to the fact that only horizontal seams or joints are to be welded. After all the joints have been welded, and the grid R' has cooled down, the outer periphery can be made ready for welding to the support ring 7 i.e. the outer periphery can be turned true and provided with suitable welding edges or corners. The welding of the grid R' to the outer support ring 7 can also be effected in the illustrated device advantageously with the grid R' in vertical position. Because of the avoidance of welding drop formation, the illustrated horizontal welding with the grid R' in vertical position is recommended even though basically vertical welding would also be possible. With another mode of the method of the invention (note FIG. 6), the grid structural units 20 are initially assembled into rows 41 of varying chord length, are held in aligned position and welded to one another. To hold the grid structural units 20 in aligned or suitably oriented position, the holding and centering device according to FIG. 8a can be used i.e. joining of the grid structural units 20 is again initially effected by means of spot welds and, after cooling, the grid rows 41 can finally be welded together by means of the welding device according to FIG. 8. These grid rows of varying chord lengths can then be mounted or welded together into a complete core support structure K by means of the device according to FIG. 8 in the next operation, it being especially advantageous for this process that, when welding together the individual grid structural units into grid rows 41, only an expansion or a contraction in the one direction takes place and, when welding together the grid rows 41 into complete core support structures, then only an expansion or a contraction in a direction perpendicular to the one direction occurs. In this manner, defined expansion ratios or conditions are obtained during the welding process which afford an especially great accuracy. FIGS. 9 and 9a show in respectively elevational and plan views, an individual profile rod cross 20" provided with recesses 42 so as to form feet 43. A plate 44 is welded to the feet 43. These base elements 20" provided with plates 44 are of importance for the production of lower grids 1.2 (note FIG. 2), which must have support surfaces for the fuel elements 5' on the upper side thereof. The method of welding together the grid structural units and the further production steps for producing the complete core support structure are then carried out in a manner analogous to that described hereinbefore. The plates 44 can then be milled to measure or gauge by means of profile cutters at the finished grid. In this regard, it is advantageous for the profile cutters to be able to sweep over the entire surface of the grid in one pass.

There are claimed:

1. Core support structure for nuclear power plants, comprising a grid of mutually crossing bridges and a support ring surrounding said grid and connected to ends of the outer bridges of said grid, said grid being formed of profile rod crosses having legs of given length, respective legs of pairs of adjacent crosses abutting one another endwise to form together a side of the smallest mesh opening of said grid, and weld means for securing said profile rod crosses to one another at the mutually abutting ends of the legs thereof.

2. Core support structure according to claim 1 wherein said profile rod crosses are formed respectively with four legs of equal length, and said weld means comprises respective weldments located in the middle of each side of said mesh openings.

3. Core support structure according to claim 1 wherein said profile rod crosses are formed of two pairs of opposite legs, the legs of each pair thereof being of equal size, the legs of one of said pairs being shorter than the legs of the other of said pairs, the longer legs of said profile rod crosses being secured by the respective weld means to the respective shorter legs of the adjacent profile rod crosses.

4. Core support structure according to claim 1 wherein most of said profile rod crosses of said grid are each formed with legs of given relative length except for profile rod crosses in the marginal zone of said grid at said support ring, the latter profile rod crosses respectively having longer and shorter legs than those of said profile rod crosses having legs of given relative length in accordance with the curvature of the circular support ring.

* * * * *